US012404096B2

(12) United States Patent
Morand

(10) Patent No.: US 12,404,096 B2
(45) Date of Patent: Sep. 2, 2025

(54) CASSETTE AND APPARATUS FOR PACKING DISPOSABLE OBJECTS INTO AN ELONGATED TUBE OF FLEXIBLE MATERIAL

(71) Applicant: International Refills Company Limited, Christ Church (BB)

(72) Inventor: Michel Morand, Montreal (CA)

(73) Assignee: INTERNATIONAL REFILLS COMPANY LIMITED (BB)

( * ) Notice: Subject to any disclaimer, the term of this patent is extended or adjusted under 35 U.S.C. 154(b) by 0 days.

(21) Appl. No.: 18/375,791

(22) Filed: Oct. 2, 2023

(65) Prior Publication Data

US 2024/0083674 A1 Mar. 14, 2024

Related U.S. Application Data

(60) Continuation of application No. 15/145,977, filed on May 4, 2016, now Pat. No. 11,772,888, which is a (Continued)

(30) Foreign Application Priority Data

Oct. 5, 2007 (EP) .................................... 07019571

(51) Int. Cl.

*B65F 1/06* (2006.01)
*B65B 9/20* (2012.01)

(Continued)

(52) U.S. Cl.

CPC ................ *B65F 1/062* (2013.01); *B65B 9/20* (2013.01); *B65B 43/267* (2013.01);

(Continued)

(58) Field of Classification Search

CPC ...... B65F 1/062; B65F 1/16; B65F 2240/132; B65F 1/1646; B65F 2210/167;

(Continued)

(56) References Cited

U.S. PATENT DOCUMENTS

| | | | |
|---|---|---|---|
| 2,671,906 | A | 3/1954 | Potts |
| 3,452,368 | A | 7/1969 | Couper |

(Continued)

FOREIGN PATENT DOCUMENTS

| | | |
|---|---|---|
| CA | 1298191 | 3/1992 |
| CA | 2197177 | 2/1996 |

(Continued)

OTHER PUBLICATIONS

Petition and Exhibit List from Inter Partes Review No. 2016-01154 re U.S. Pat. No. 8,899,420.

(Continued)

*Primary Examiner* — Jacob K Ackun

(74) *Attorney, Agent, or Firm* — CANTOR COLBURN LLP

(57) ABSTRACT

A cassette for dispensing bags from an elongated tubing comprising an annular receptacle accommodating a length of tubing in an accumulated condition. An annular opening at an upper end of the annular receptacle is for dispensing the tubing. The annular receptacle defines a central opening through which a knotted end of the tubing passes to form a bag supported by the annular receptacle with disposable objects passing through the circular central opening to be received in the bag, and a clearance only at a bottom of the central opening.

18 Claims, 7 Drawing Sheets

Related U.S. Application Data continuation of application No. 14/256,650, filed on Apr. 18, 2014, now Pat. No. 9,521,469, which is a continuation of application No. 14/017,842, filed on Sep. 4, 2013, now Pat. No. 8,899,420, which is a continuation of application No. 13/324,234, filed on Dec. 13, 2011, now abandoned, which is a division of application No. 12/245,172, filed on Oct. 3, 2008, now abandoned.

(51) Int. Cl.
*B65B 43/26* (2006.01)
*B65B 67/12* (2006.01)
*B65F 1/16* (2006.01)

(52) U.S. Cl.
CPC ...... *B65B 67/1266* (2013.01); *B65B 67/1277* (2013.01); *B65F 1/16* (2013.01); *B65F 1/1646* (2013.01); *B65F 2210/167* (2013.01); *B65F 2240/132* (2013.01)

(58) Field of Classification Search
CPC ... B65B 67/1266; B65B 9/20; B65B 67/1277; B65B 43/267
USPC .......................................................... 53/545
See application file for complete search history.

(56) References Cited

U.S. PATENT DOCUMENTS 3,534,866 A 10/1970 Asenbauer
3,536,192 A * 10/1970 Couper ................ A47K 17/003 206/446
3,547,309 A 12/1970 Pusey
3,556,333 A 1/1971 Word
3,613,943 A 10/1971 Bridenstine
3,638,827 A 2/1972 Lau
3,693,193 A 9/1972 May
3,723,999 A 4/1973 Miller
3,746,159 A 7/1973 May
3,853,223 A 12/1974 Nowlain
3,888,406 A 6/1975 Nippes
4,693,372 A 9/1987 O'Neill
4,790,124 A 12/1988 Kaji
4,869,049 A 9/1989 Richards
4,917,263 A 4/1990 Korb
4,934,529 A 6/1990 Richards et al.
4,949,872 A 8/1990 Heaps, Jr.
5,056,293 A 10/1991 Richards et al.
5,062,539 A 11/1991 Chandler
D322,030 S 12/1991 Chumenti
5,117,778 A 6/1992 Imamura
5,337,581 A 8/1994 Lott
5,590,512 A 1/1997 Richards
5,632,401 A 5/1997 Hurd
D381,472 S 7/1997 Catalano et al.
5,699,925 A 12/1997 Petruzzi
5,803,300 A 9/1998 DeMars
5,813,200 A 9/1998 Jacoby et al.
5,947,295 A 9/1999 Lutin
5,971,194 A 10/1999 Freedland
6,065,272 A 5/2000 Lecomte
6,116,780 A 9/2000 Young
6,128,890 A * 10/2000 Firth ..................... B65F 1/1607 83/649
6,170,240 B1 1/2001 Jacoby et al.
6,471,402 B1 10/2002 Burns
6,516,588 B2 2/2003 Jensen
6,578,730 B2 6/2003 Trunsky
6,612,099 B2 9/2003 Stravitz
6,672,472 B1 1/2004 Rockwood et al.
6,719,194 B2 4/2004 Richards
6,722,107 B2 4/2004 Morand
6,817,164 B2 11/2004 Mauffette et al.
6,851,251 B2 2/2005 Stravitz
6,925,781 B1 8/2005 Knuth et al.
6,931,684 B1 8/2005 Henegar
6,941,733 B2 9/2005 Chomik et al.
6,974,029 B2 12/2005 Morand
6,993,891 B2 2/2006 Richardson et al.
7,073,311 B2 7/2006 Chomik et al.
7,080,418 B2 7/2006 Henegar
7,086,569 B2 8/2006 Stravitz
7,100,767 B2 9/2006 Chomik
7,114,314 B2 10/2006 Stravitz
7,114,534 B2 10/2006 Chomik et al.
7,178,314 B2 2/2007 Chomik et al.
7,350,663 B2 4/2008 Chomik et al.
7,406,814 B2 8/2008 Morand
7,434,377 B2 10/2008 Stravitz et al.
7,490,731 B2 2/2009 Hautop
7,500,339 B2 3/2009 Knuth et al.
7,617,659 B2 11/2009 Stravitz et al.
7,617,660 B2 11/2009 Morand
7,707,808 B2 5/2010 Chomik
7,841,853 B2 11/2010 Yu
7,931,150 B2 * 4/2011 Morand ................ B65F 1/1646 220/495.07
8,484,936 B2 7/2013 Tannock
8,899,420 B2 12/2014 Morand
11,772,888 B2 * 10/2023 Morand .................. B65F 1/062 206/554
2002/0078665 A1 * 6/2002 Salman ............... B65B 67/1277 53/459
2002/0130060 A1 9/2002 Carson et al.
2002/0162304 A1 * 11/2002 Stravitz ..................... B65F 1/12 53/526
2003/0038860 A1 2/2003 Trafton et al.
2003/0121923 A1 * 7/2003 Morand ................. A47K 11/02 220/495.07
2003/0121932 A1 7/2003 Morand
2003/0154696 A1 8/2003 Morand
2003/0213804 A1 11/2003 Chomik et al.
2003/0218022 A1 11/2003 Chomik
2004/0020175 A1 * 2/2004 Stravitz ..................... B09B 3/20 53/567
2004/0134914 A1 7/2004 Richards
2004/0194433 A1 10/2004 Chomik et al.
2004/0246304 A1 * 12/2004 Takahashi .............. B41J 2/1752 347/49
2004/0256406 A1 12/2004 Allen
2005/0016890 A1 * 1/2005 Tannock ............. B65B 67/1277 206/497
2005/0028491 A1 2/2005 Stravitz
2005/0044819 A1 3/2005 Chomik et al.
2005/0103499 A1 * 5/2005 Chomik ................. A47K 11/02 166/348
2005/0115207 A1 6/2005 Chomik
2005/0150804 A1 7/2005 Chen
2005/0183400 A1 8/2005 Stravitz et al.
2005/0183401 A1 8/2005 Stravitz et al.
2005/0193691 A1 9/2005 Stravitz et al.
2005/0205453 A1 9/2005 Gindi et al.
2005/0217214 A1 10/2005 Richardson et al.
2005/0274093 A1 12/2005 Stravitz et al.
2006/0021301 A1 2/2006 Stravitz et al.
2006/0130439 A1 6/2006 Stravitz et al.
2006/0237461 A1 * 10/2006 Chomik .............. B65B 67/1277 220/264
2006/0248862 A1 11/2006 Morand
2006/0249418 A1 11/2006 Chomik et al.
2006/0266751 A1 11/2006 Ali et al.
2007/0080092 A1 4/2007 DeLuca
2007/0175182 A1 * 8/2007 Stravitz ................... B65F 1/062 53/576
2007/0180798 A1 * 8/2007 Stravitz ................... B65F 1/062 53/576
2007/0246465 A1 * 10/2007 Stravitz ..................... B65F 1/12 220/660
2008/0121640 A1 5/2008 Chomik et al.

(56) References Cited

U.S. PATENT DOCUMENTS

2008/0272140 A1* 11/2008 Mowers .................. B65F 1/062
221/69

FOREIGN PATENT DOCUMENTS

| | | | |
|---|---|---|---|
| CA | 2366384 | A1 | 6/2003 |
| CA | 2366435 | A1 | 7/2003 |
| CA | 2383799 | A1 | 10/2003 |
| CA | 2473693 | A1 | 10/2003 |
| CA | 2441837 | | 5/2004 |
| CA | 2479484 | A1 | 3/2005 |
| CA | 2532230 | A1 | 10/2006 |
| CA | 2640384 | A1 | 4/2009 |
| CA | 2855159 | A1 | 4/2009 |
| CA | 2936402 | A1 | 4/2009 |
| CA | 2936414 | A1 | 4/2009 |
| CA | 2936415 | A1 | 4/2009 |
| CA | 2936420 | A1 | 4/2009 |
| CA | 2936421 | A1 | 4/2009 |
| CA | 2974663 | A1 | 4/2009 |
| CA | 2937312 | A1 | 10/2009 |
| CA | 2686128 | | 1/2013 |
| DE | 816342 | | 10/1951 |
| DE | 2239880 | | 2/1974 |
| DE | 9319683 | | 6/2006 |
| DE | 202005020171 | | 7/2006 |
| DE | 202005015081 | | 3/2007 |
| DE | 202005015117 | | 3/2007 |
| EM | 000792031-0001 | | 9/2007 |
| EP | 0005660 | | 11/1979 |
| EP | 0303517 | A1 | 2/1989 |
| EP | 0353922 | A1 | 2/1990 |
| EP | 0356051 | A1 | 2/1990 |
| EP | 0690006 | A1 | 1/1996 |
| EP | 1062167 | B1 | 12/2000 |
| EP | 1283170 | A1 | 2/2003 |
| EP | 1212248 | B1 | 8/2003 |
| EP | 1324919 | B1 | 9/2003 |
| EP | 1343694 | B1 | 8/2005 |
| EP | 2019042 | A1 | 1/2009 |
| EP | 2045197 | A1 | 4/2009 |
| EP | 2091847 | B1 | 3/2011 |
| EP | 1680340 | B1 | 11/2011 |
| EP | 2167404 | B1 | 2/2013 |
| EP | 2818430 | A1 | 12/2014 |
| GB | 2206094 | B | 12/1988 |
| GB | 2216398 | A | 10/1989 |
| GB | 2409866 | A | 7/2005 |
| JP | 05146700 | | 6/1993 |
| JP | 05286503 | | 11/1993 |
| JP | 06183505 | | 7/1994 |
| JP | 08-224883 | | 9/1996 |
| JP | 2000-062902 | | 2/2000 |
| JP | 2000247401 | | 9/2000 |
| JP | 325684 7 | | 2/2002 |
| JP | 2003-241353 | | 8/2003 |
| JP | 2004175508 | | 6/2004 |
| JP | 4003702 | B2 | 11/2007 |
| WO | 9817536 | | 4/1998 |
| WO | 1999020547 | | 4/1999 |
| WO | 0249919 | A1 | 6/2002 |
| WO | 02100723 | A1 | 12/2002 |
| WO | 2002100723 | A1 | 12/2002 |
| WO | 2005042381 | A2 | 5/2005 |
| WO | 2006028988 | A1 | 3/2006 |
| WO | 2006029038 | A2 | 3/2006 |
| WO | 2007028230 | A1 | 3/2007 |
| WO | 2007071054 | A1 | 6/2007 |

OTHER PUBLICATIONS

Request for Cancellation re DE 202007019629 dated Jul. 15, 2015, and English translation thereof.
Response to Request for Cancellation re DE 202007019629 dated Feb. 4, 2016, and English translation thereof.
Petition and Exhibit List from Inter Partes Review No. 2017-00050 re U.S. Pat. No. 8,899,420.
Definition of "continuous" from Merriam-Webster's Online Dictionary, available at http://www.merriamwebster.com/dictionary/continuous, accessed on May 16, 2016.
USPTO, Prior Art Under the AIA, First Inventor to File Comprehensive Training, available at http://www.uspto.gov/sites/default/files/aia_implementation/fitf_comprehensive_training_prior_art_under_aia.pdf , accessed on May 16, 2016.
Declaration of Jeffrey Swan, May 17, 2016.
Design Project Online Resource Mechanics of Materials, accessible at http://www.esm.psu.edu/courses/emch13d/design/designtech/ manufacturing/manuf 12.html, as archived on Mar. 20, 2005 on https://archive.org/web/, accessed Aug. 14, 2016.
Injection Moulding, accessible at http://people.bath.ac.uk/en3hl/inject.html, as archived on Dec. 3, 2007 on https://archive.org/web/, accessed Aug. 14, 2016.
ISBN information for Boothroyd (Ex. 1120-3) at www.lookupbyISBN.com, accessed on Aug. 17, 2016.
ISBN information for Rosato (Ex. 1121-2) at www.lookupbyISBN.com, accessed on Aug. 17, 2016.
ISBN information for Bryce (Ex. 1122-2) at www.lookupbyISBN.com, accessed on Aug. 17, 2016.
Geoffrey Boothroyd et al., Product Design,for Manufacture and Assembly (1994).
Dominick V. Rosato et al., Injection Molding Handbook (3rd ed. 2000).
Douglas M. Bryce, Plastic Injection Molding, manufacturing process fundamentals (vol. 1, Apr. 30, 1996).
Declaration of A. Justin Poplin, Oct. 7, 2016.
Declaration of Jeffrey Swan, Oct. 10, 2016.
European Search Report for corresponding application EP19182215; Report dated Jan. 7, 2020.
Opposition documents against German Utility Model 20 2007 019 629.6; Jul. 15, 2015.
Opposition documents against German Utility Model 20 2007 019 629.6; Feb. 4, 2016.
International Search Report, Application No. PCT/CA2006/002104.
International Search Report, Application No. PCT/GB02/02627.
PCT International Preliminary Report on Patentability; International Application No. PCT/US2008/062367; International Filing Date May 2, 2008; Date of Mailing Nov. 10, 2009.
Product Instruction Sheet, "Getting to Know Your Diaper Genie II", 2006 Playtex Products, Inc. (p. 75-190-A).
Canadian Office Action for corresponding application 3,030,263; Report Dated Mar. 13, 2020.

* cited by examiner

CASSETTE AND APPARATUS FOR PACKING DISPOSABLE OBJECTS INTO AN ELONGATED TUBE OF FLEXIBLE MATERIAL

CROSS-REFERENCE TO RELATED APPLICATIONS

The present patent application is a continuation of U.S. patent application Ser. No. 15/145,977 filed on May 4, 2016, which is a continuation of U.S. patent application Ser. No. 14/526,650 filed on Oct. 29, 2014, now abandoned, which is a continuation of U.S. patent application Ser. No. 14/017,842 filed on Sep. 4, 2013, now patented to U.S. Pat. No. 8,899,420, which is a continuation of U.S. patent application Ser. No. 13/324,234 filed on Dec. 13, 2011, now abandoned, which is a divisional of U.S. patent application Ser. No. 12/245,172, filed on Oct. 3, 2008, now abandoned, which claims priority to European Patent Application No. 07019571.4, filed on Oct. 5, 2007, all of said applications being incorporated by reference herein in their entirety.

FIELD OF THE APPLICATION

The present application relates to an apparatus for packaging disposable material or objects into a tube of flexible plastic film material. More specifically, the invention relates to an apparatus for use to package waste material, for example babies' disposable diapers, or any other kind of appropriate objects or material, into a tube of flexible plastic film material and to store the so packaged waste material in a hygienic and a substantially odor-free manner, until it is collected.

BACKGROUND OF THE ART

Known apparatuses of the above-mentioned type generally comprise a container having an open or openable upper portion in which the waste to be disposed of may be inserted and a bottom portion in which the disposed waste is stored. A ring-shaped cassette is mounted in the upper portion of the container, and contains, in a pleated form, a tube of flexible plastic film material which is formed into an elongated tube which is knotted at a bottom end and into which the waste material may be inserted and temporarily stored.

In use, the waste to be disposed of is inserted into the tube at the upper portion of the container and the tube and waste are then pushed through the open center of the cassette towards the bottom portion of the container for storage purposes. Closeable means are also provided for closing the tube below the cassette and thus preventing bad odors from escaping from the tube during storage.

In Canadian Patent No. 1,298,191, these closeable means are disclosed as a core that can be turned by a lid about a cylinder in order to twist the tube at regular intervals to form successive "pouches" that are kept sealed while they are stored.

In Canadian laid-open Application No. 2,383,799, a squeezing device is mounted in the container below the cassette to pull the tube from the cassette and move it down together with the objects inserted into the container. This squeezing device comprises a pair of opposite rotatable members between which the tube is inserted. The rotatable members have a plurality of opposite bars extending transversely to the tube in order to squeeze the tube, keep it closed until other objects to be disposed of are inserted into the upper portion of the container, and pull it down to move the plastic film forming the tube and the objects contained therein towards the bottom portion of the container for storage purpose. Actuation of the rotatable members in unison and in opposite direction to achieve the requested squeezing, closing and pulling down of the plastic film tube is preferably obtained by actuation of a lever that is part of the container.

In Canadian laid-open Application No. 2,441,837, a plunging device is provided to compress the object to be disposed of, and push it into the tube and to the bottom part of the container. The plunging device includes two arms with pivoting flaps attached thereto and opposing pivotable slides.

All of these prior art devices have several disadvantages. Their mechanisms have many parts and are prone to breakage. These devices are also not user-friendly and difficult to understand the operation thereof when first purchased. They are costly to fabricate and they utilize excess film from the cassettes, adding to the cost of use. Some also do not effectively contain the odors of the disposed material. Some cause confusion in their installation, causing improperly oriented cassettes and contamination of the cassette walls.

SUMMARY OF THE APPLICATION

It is therefore an aim of the present invention to provide a novel apparatus for packing disposable objects into an elongated tube of flexible plastic film material that addresses issues associated with the prior art.

Therefore, in accordance with a first embodiment of the present application, there is provided a cassette for dispensing bags from an elongated tubing comprising an annular receptacle accommodating a length of tubing in an accumulated condition, an annular opening at an upper end of the annular receptacle for dispensing the tubing, the annular receptacle defining a central opening through which a knotted end of the tubing passes to form a bag supported by the annular receptacle with disposable objects passing through the circular central opening to be received in the bag, and a clearance only at a bottom of the central opening.

In accordance with the first embodiment, the clearance is in the shape of a chamfer.

In accordance with the first embodiment, a removable lid closes the annular opening of the annular receptacle.

In accordance with the first embodiment, an outer periphery of the annular receptacle tapers downwardly.

In accordance with the first embodiment, the annular opening is adjacent to an outer periphery of the annular receptacle.

In accordance with the first embodiment, the clearance extends on the full periphery of the central opening.

In accordance with the first embodiment of the present application, there is provided an apparatus for packing at least one disposable object into an elongated tube of flexible material, comprising a bin defining an enclosure with an opening defined at a top thereof for receiving at least one disposable object to be packed; a holder within the bin proximate the opening; a closing mechanism located below the holder comprising first and second portions, the second portion being biased in a closed position against the first portion and defining a receiving surface for receiving the at least one disposable object, the second portion being slidable from the closed position to an open position through application of a substantially vertical force against the receiving surface and being slidable from the open position to the closed position under the action of biasing means, the closing mechanism in the open position defining a passage between the opening of the bin and a bottom portion of the enclosure located below the closing mechanism, the closing mechanism in the closed position closing the said passage; and the cassette supported by the holder in the opening of the bin with the clearance allowing the cassette not to impede the motion of the closing mechanism from the closed position to the open position.

Still in accordance with the first embodiment, the holder comprises a first annular flange extending inwardly from an outer wall of the bin, a tubular wall extending generally downwardly from an inner end of the first annular flange, and a second annular wall extending inwardly from a bottom end of the tubular wall, thus forming a seat for receiving the cassette.

Still in accordance with the first embodiment, the tubular wall tapers in a downward direction, and the annular body has a corresponding frustoconical outer periphery for complementary engagement of the cassette in the holder.

Still in accordance with the first embodiment, the opening of the bin is surrounded by a removable lid, the lid opening/closing access to the opening of the bin, the lid being prevented from being installed properly when the cassette is oriented upside down in the holder.

In accordance with a second embodiment of the present application, there is provided: a cassette for dispensing bags from an elongated tubing comprising an annular receptacle accommodating a length of tubing in an accumulated condition, an annular opening at an upper end of the annular receptacle for dispensing the tubing, the annular receptacle defining a central opening through which a knotted end of the tubing passes to form a bag supported by the annular receptacle with disposable objects passing through the circular central opening to be received in the bag, and a clearance only at a bottom of an outer periphery of the annular receptacle.

In accordance with the second embodiment, the clearance forms a frusto-conical geometry at the bottom of the annular receptacle.

In accordance with a third embodiment, there is provided: an apparatus for packing at least one disposable object into an elongated tube of flexible material, comprising: a bin defining an enclosure with an opening defined at a top thereof for receiving at least one disposable object to be packed; a holder within the bin proximate the opening, and an interfering member at a bottom of the holder; a closing mechanism located below the holder comprising first and second portions, the second portion being biased in a closed position against the first portion and defining a receiving surface for receiving the at least one disposable object, the second portion being slidable from the closed position to an open position through application of a substantially vertical force against the receiving surface and being slidable from the open position to the closed position under the action of biasing means, the closing mechanism in the open position defining a passage between the opening of the bin and a bottom portion of the enclosure located below the closing mechanism, the closing mechanism in the closed position closing the said passage, a cassette supported by the holder in the opening of the bin and having an annular receptacle to accommodate a length of tubing in an accumulated condition, the annular receptacle having an upper annular opening for dispensing the tubing such that the tubing extends through a central opening of the annular receptacle and with a knotted end thereof into the enclosure of the bin to receive disposable objects, whereby the closing mechanism closes the tubing, the annular body having a clearance in a bottom portion of an outer periphery of the annular receptacle, so as to cooperate with the interfering member for the cassette to be aligned with the top of the bin in a desired orientation; and a removable lid positioned flush on the top of the bin only when the cassette is in the desired orientation, the cover opening/closing access to the opening of the bin.

DESCRIPTION OF THE PREFERRED EMBODIMENTS

Figure 1:
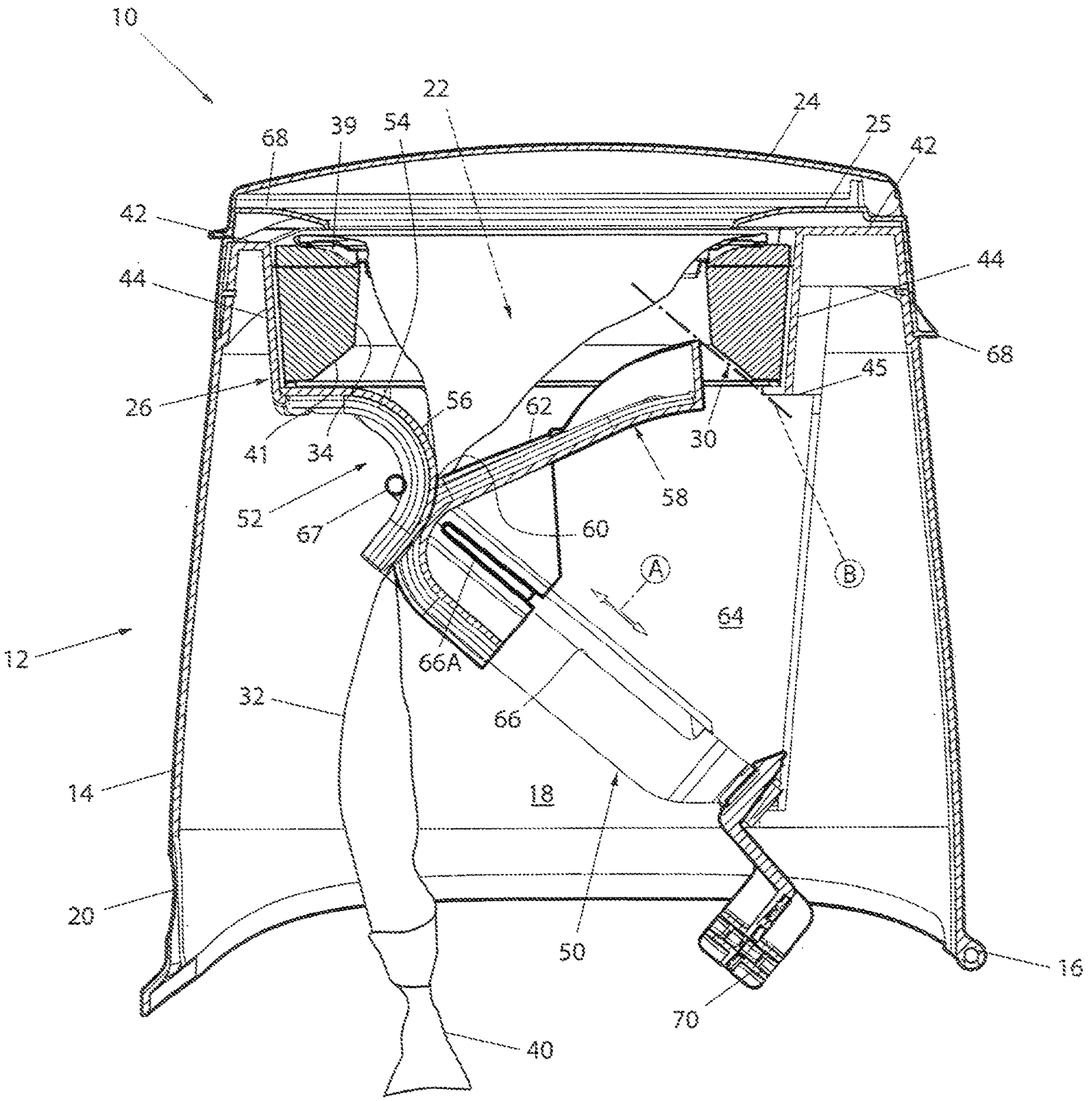
FIG. 1 is a cross-sectional view of an apparatus according to a first embodiment of the present invention.

Referring to FIG. 1, there is shown an apparatus 10 for packaging disposable objects in an elongated tube of flexible plastic film material. The apparatus 10 comprises a bin 12 having a top portion 14 and a bottom portion (not shown) hingedly connected to each other by a hinge member 16, with outer walls of the top portion 14 and bottom portion defining an enclosure 18 of the bin 12.

The top portion 14 and bottom portion are locked together with a mechanism such as a push button latch (not shown) received in eyelet 20, located opposite of the hinge member 16. Upon actuation of the push button, the top portion 14 and bottom portion are disconnected and can be pivoted apart about the hinge member 16 to provide access to the enclosure 18, for example to empty the bin 12.

The top portion 14 defines an opening 22 for receiving disposable objects therethrough. The bin 12 further comprises a lid 24 hingedly connected to a ring 25, for instance in the shape of a funnel (hereinafter funnel 25), although multiple shapes are considered such as a flat ring, as long as the ring forms an opening guidance. The funnel 25 is mounted to the top portion 14 such as to selectively open and close access to the opening 22 through pivoting motion of the lid 24. Although in the embodiment shown the apparatus has a generally circular opening 22, the bin 12 is not limited to circular openings and could function with openings of different shapes.

Still referring to FIG. 1, the apparatus 10 also comprises a holder 26 located within the top portion 14 proximate the opening 22 for holding a cassette 30 of flexible plastic film tubing 32. The cassette 30 has an annular body defining a central opening 34 which is generally aligned with the bin opening 22 when the cassette 30 is accommodated in the holder 26.

Figure 2A:
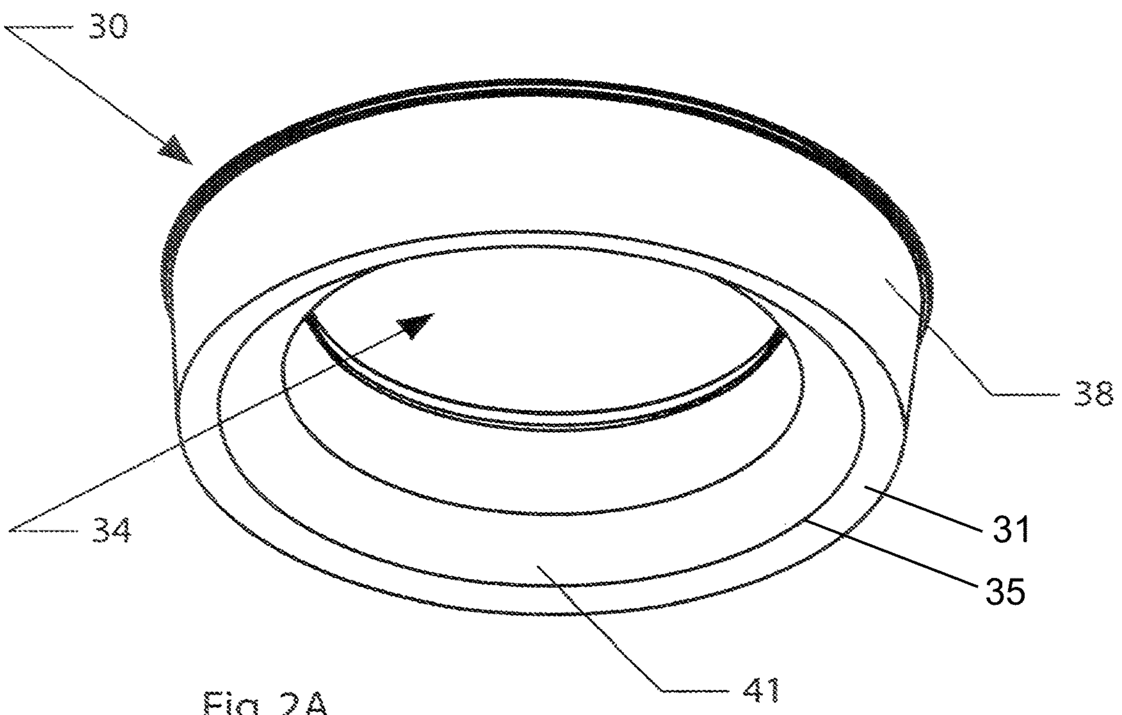
FIG. 2A is a bottom perspective view of a cassette to be used with the apparatus of FIG. 1.
Figure 2B:
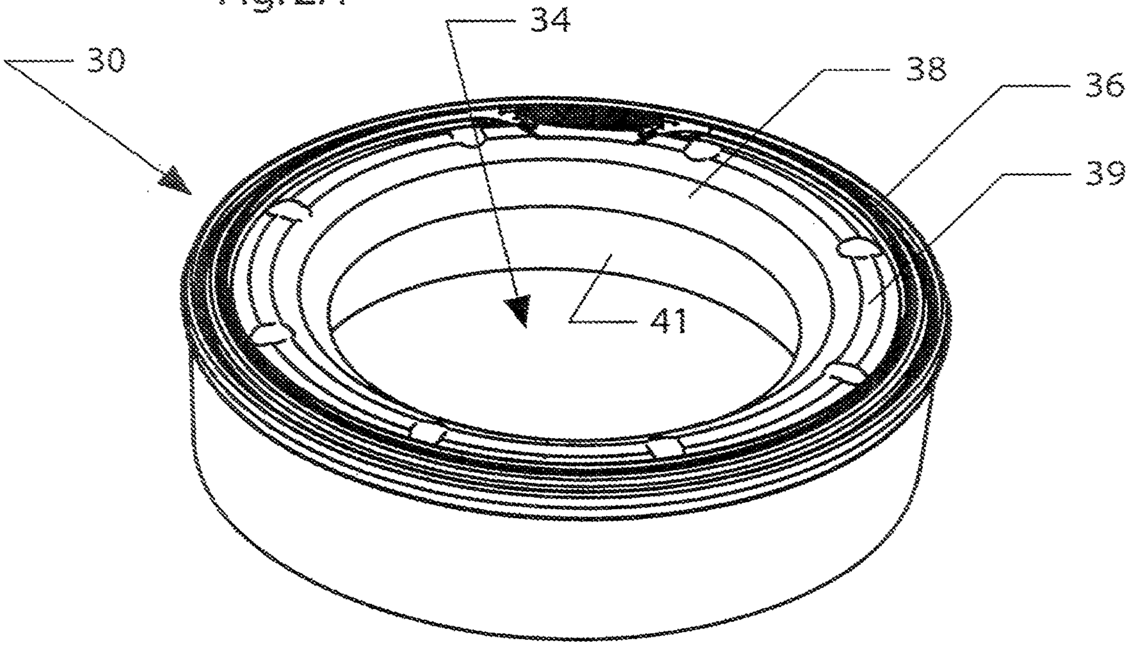
FIG. 2B is a top perspective view of the cassette of FIG. 2A.

Referring concurrently to FIGS. 1, 2A and 2B, the cassette 30 has a lid 36 and a bottom annular receptacle 38. The bottom annular receptacle 38 has a lower surface 31, and an edge 35 delimiting the lower surface 31. After the lid 36 is removed, the flexible tubing 32 exits from an upper annular opening of the receptacle 38, adjacent an outer periphery thereof. It is pointed out that once the lid 36 is removed, there remains an upper flange 39 adjacent to the annular opening that maintains the compressed tubing 32 in the receptacle 38. The cassette 30 comprises a length of flexible plastic film material that is accumulated (e.g., folded). As shown in FIG. 1, a knot 40 is found at the free end of the tubing 32 to form a bag end. The knot 40 and a length of the tubing 32 extend from the cassette 30 into the enclosure 18 of the bin 12, passing through the central opening 34 of the cassette 30. To better contain odors, it is preferable that the film material of the tubing 32 be a multiple layer film having an odor barrier therein such that odors do not permeate through the film material. The receptacle 38 of the cassette 30 defines a chamfer clearance 41 at a bottom of the central opening 34. The chamfer clearance 41 is provided in order to ensure that the cassette 30 is properly installed in the holder 26 when the apparatus 10 is in use, as will be described hereinafter. The chamfer clearance 41 is provided on the full periphery of the cassette 30, but may also be partial (i.e., not on the full periphery of the central opening of the cassette).

Referring to FIG. 1, the holder 26 includes a top annular flange 42 extending inwardly from the top of the bin 12. A tubular wall 44 extends downwardly from an inner end of the top annular flange 42. The holder 26 has a horizontal flange 45 at a bottom of the wall 44, so as to define a seat supporting the cassette 30. One will also appreciate that the holder 26 may take many alternate shapes and forms.

Referring to FIGS. 1 and 3A-3C, the apparatus 10 further includes a closing mechanism 50 whose purpose is to provide access to the flexible tubing 32 extending therebelow and preventing odors from escaping from the flexible tubing 32. In one form of use, it permits the disposable objects to push down against the bottom of the tubing 32 (at the knot 40) to draw out loose flexible tubing from the receptacle 38 of the cassette 30. One aspect of note is that the flexible tubing 32 passes over receptacle 38 and the closing mechanism 50, thereby isolating the receptacle 38 and the mechanism 50 from the disposable objects to be packaged, reducing the need for constant cleaning of the walls defining the opening 34 and the mechanism 50. In this respect, one will appreciate that one of the preferred uses for the apparatus 10 is the disposal of baby diapers.

The closing mechanism 50 comprises a fixed portion 52, which comprises a generally "C"-shaped member rigidly connected to the wall 44 of the holder 26. Alternate types of connections are also possible for the fixed portion 52, including connection to an additional support member connected to the holder 26 or to another part of the top portion 14. The curved fixed portion 52 defines a rounded apex 54 which projects into the opening 22, as can be seen in FIG. 1. The fixed portion 52 defines a receiving surface 56 downwardly inclined toward a movable portion 58 of the closing mechanism 50.

Figure 3A:
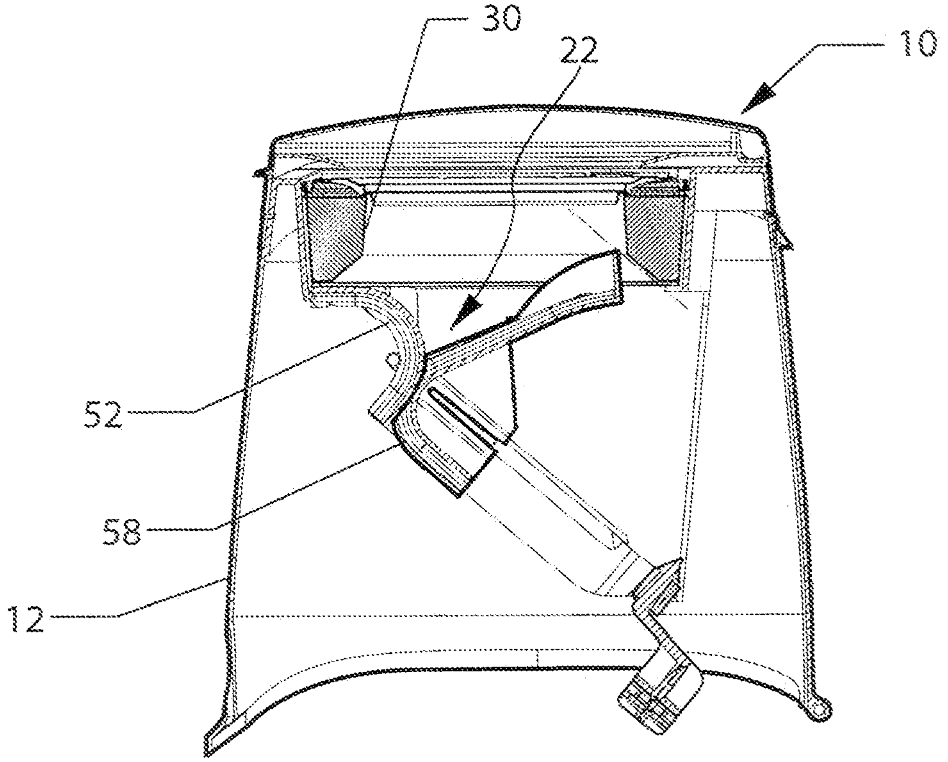
FIG. 3A is a cross-sectional view of the apparatus of FIG. 1, without tubing, with a closing mechanism in a closed position.

The movable portion 58 of the closing mechanism 50 is also generally "C"-shaped in cross-section and is biased against the fixed portion 52 in a closed position shown in FIGS. 1 and 3A such as to generally close the opening 22 of the apparatus 10, thereby scaling the tubing 32 shut. The curved movable portion 58 defines a rounded apex 60 projecting into the opening 22, as can be seen in FIG. 1. The movable portion 58 defines a receiving surface 62 downwardly inclined toward the fixed portion 52, the two receiving surfaces 56,62 forming a trough directing an object therebetween. In the closed position, contact between the two portions 52,58 is between the apex 60 of the movable portion 58 and a lower part of the fixed portion 52 located below the apex 54 thereof. These portions are wave-shaped in cross-section to provide an ergonomical shape in view of hands contacting them, as illustrated in FIG. 1. Moreover, these wave-shaped portions provide efficient sealing of a plastic film tube 32 engaged or pinched therebetween.

The movable portion 58 is slidingly supported by a pair of spaced-apart, generally vertical walls 64 (only one of which is shown in FIG. 1) extending downwardly from the holder 26, with the opening 22 being aligned therebetween. Each of the walls 64 has an angled slot 66. In the embodiment shown, the slots 66 are angled at approximately 40 degrees with respect to the horizontal, although any other working angles are suitable.

The movable portion 58 includes aligned sliding members 66A extending therefrom and engaging the slots 66, such that the movable portion 58 is slidingly movable along an angular direction defined by the slots 66, and thus along direction A. The movable portion 58 can move between a closed position, as illustrated in FIGS. 1 and 3A, in which the movable portion 58 abuts against the fixed portion 52 to seal the tubing 32 shut, and an opened position (shown in FIG. 3C) enough to let a disposable object to pass between the portions 52 and 58. The movable portion 58 is biased to the closed position of FIG. 1, for using an elongated helical spring 67 connected to and extending between the sliding members 66A of the movable portion 58 and around the back of the fixed portion 52. The concave shape of the back of the fixed portion 52 helps maintain the spring aligned in a plane defined by the slots 66.

It is of particular importance that the cassette 30 be installed in the appropriate orientation. In the appropriate orientation, as illustrated in FIG. 1, the tubing 32 is deployed from the top of the cassette 30. Accordingly, the tubing 32 covers the side walls of the cassette 30 in the opening 34. Accordingly, as the tubing 32 covers the cassette 30, there is no risk of contamination of the walls of the cassette.

As is clearly seen in FIG. 1, the chamfer clearance 41 is positioned downwardly. A path of movement of the movable portion 58 is illustrated at B. It is observed that the movable portion 58 passes closely to the wall defining the chamfer clearance 41. If the chamfer clearance 41 were not provided, the cassette 30 would impede the movement of the movable portion 58. Accordingly, if the cassette 30 were installed upside down, the movable portion 58 would be prevented from moving along its path. Therefore, if a user person wants to use the cassette 30 properly, the cassette 30 must be oriented properly.

Alternately, the fixed portion 52 can be replaced by a portion movable opposite of the movable portion 58, the two being biased together in the closed position. Such a configuration could be, for example, two sliding members symmetrical with respect to one another about a vertical axis defined at the point of contact therebetween, such as two "C"-shaped members similar in configuration to the movable member 58 shown, two rollers, etc., which are slidable away from each other upon downwardly pushing an object thereon, and are biased together for example by being interconnected by one or a plurality of springs. However, such a mechanism includes additional parts.

In order to assist the user in correctly placing the disposable object in the tubing 32, the apparatus 10 advantageously has the funnel 25 removably installed over the cassette 30, providing a downward shape around the openings 22,34, which creates a funnel effect and guides the user's hand. A handle 68 is provided to remove the lid 24/funnel 25 assembly.

Referring to FIG. 1, the apparatus 10 can further include, within the bin 12, an integrated cutting tool 70, which can be for example attached to one of the vertical walls 64, and which includes a blade located between two spaced-apart protective fingers sized such as to prevent a user's finger from reaching the blade but still allowing a portion of tubing 32 to be inserted between the fingers to be cut with the blade.

In order to prepare the apparatus 10 for use, and with reference to FIG. 1, a user person removes the lid 24 and funnel 25 assembly and inserts the cassette 30 in the correct orientation (i.e., with the chamfer clearance 41 facing downward. The user person withdraws a free end of the tubing 32 from the cassette 30, takes a leading edge of flexible tubing 32, ties it into the knot 40 and pushes the knot 40 through the openings 22,34 and beyond the closing mechanism. It is pointed out that the knot 40 may be made prior to the cassette 30 being installed. The movable portion 58 opens as a result of the downward pressure, whereby the knot 40 reaches the enclosure 18 below the closing mechanism 50.

Alternately, the tube end with the knot 40 could be pulled down to the bottom of the bin 12, for example by pivoting and opening the top portion 14 such as to gain access to the enclosure 18, and pulling the tube end with the knot 40 through the closing mechanism 50 and beyond to the bottom of the bin 12. The top portion 14 is then re-engaged with the bottom portion, and the lid 24/funnel 25 assembly is reinstalled on the top portion 14. Accordingly a length of empty flexible tubing 32 extends to the bottom and is now ready to receive disposable objects therein. Therefore, the film material is not pulled from the cassettes 30 as disposable objects are placed into the tube.

In use, when a disposable object needs to be packaged, the lid 24 of the apparatus 10 is lifted, thereby providing access to the opening 22. The disposable object to be packaged is placed into the opening 22 (in this case, the cassette 30 of flexible tubing 32 surrounds the object). The receiving surfaces 56,62 of the fixed and movable portions 52,58 of the closing mechanism 50 biased together in the closed position form a trough which directs the disposable object in the hand of a user person toward a contact region therebetween.

Figure 3B:
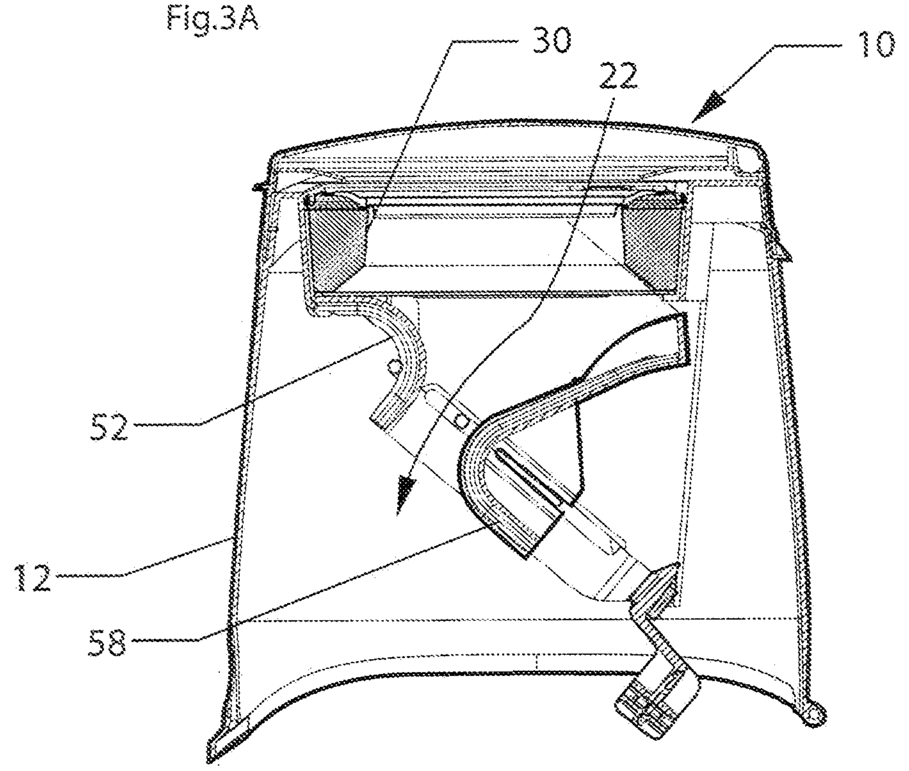
FIG. 3B is a cross-sectional view of the apparatus of FIG. 3A, with the closing mechanism displaced toward an open position.
Figure 3C:
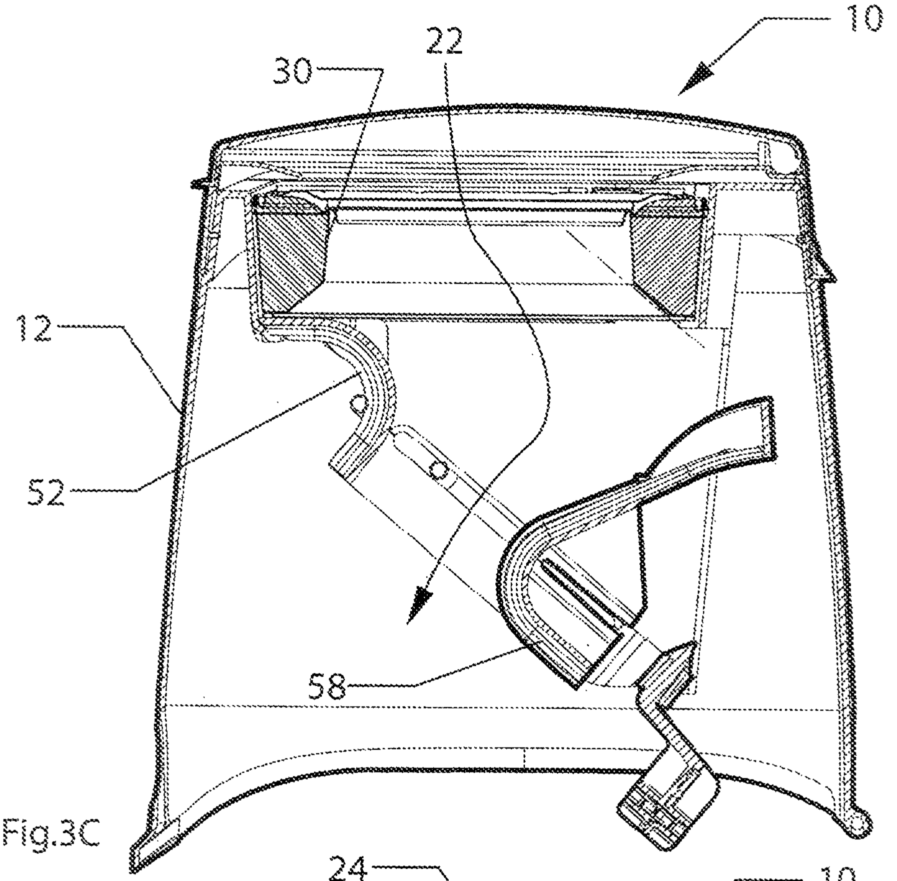
FIG. 3C is a cross-sectional view of the apparatus of FIG. 3A, with the closing mechanism in the fully open position.

The user person pushes the disposable object in a downward direction, gradually opening the movable portion 58, as is shown in FIGS. 3B and 3C. The angled receiving surface 62 of the movable portion 58 helps the downward force to be easily converted along the direction of the slots 66 such as to force the movable portion 58 from its closed position in contact with the fixed portion 52 (FIG. 3A) to its open position (FIG. 3C) against the force of the spring 67, through a sliding movement illustrated by direction A in FIG. 1. Since the movable portion 58 is moved by the force applied on the disposable object, it slides only enough for the disposable object to go past the closing mechanism 50, with most of the opening created by the movement of the movable portion 58 being blocked by the disposable object such as to minimize the propagation of odors through the opening 22.

Once the disposable object passes beyond the apex 60 of the movable portion 58, the user person releases the disposable object and withdraws his or her hand. The movable portion 58, under the action of the spring 67, rapidly returns to the closed position of FIGS. 1 and 3A, through a sliding movement, effectively sealing the object within the flexible tubing 32. The curved profile of the fixed portion 52 below the apex 60 and, more importantly, of the movable portion 58 below the apex 60 helps push the disposable object further down, if there is resistance, as the movable portion 58 returns to the closed position to apply a downward pushing force.

It is pointed out that different configurations of the cassette are considered. For instance, clearances of different shapes can be used instead of a chamfer. The use of a chamfer shape does not substantially reduce the volume of the receptacle 38 of the cassette 30, thereby generally preserving the quantity of tubing 32 received in the cassette 30.

Figure 4:
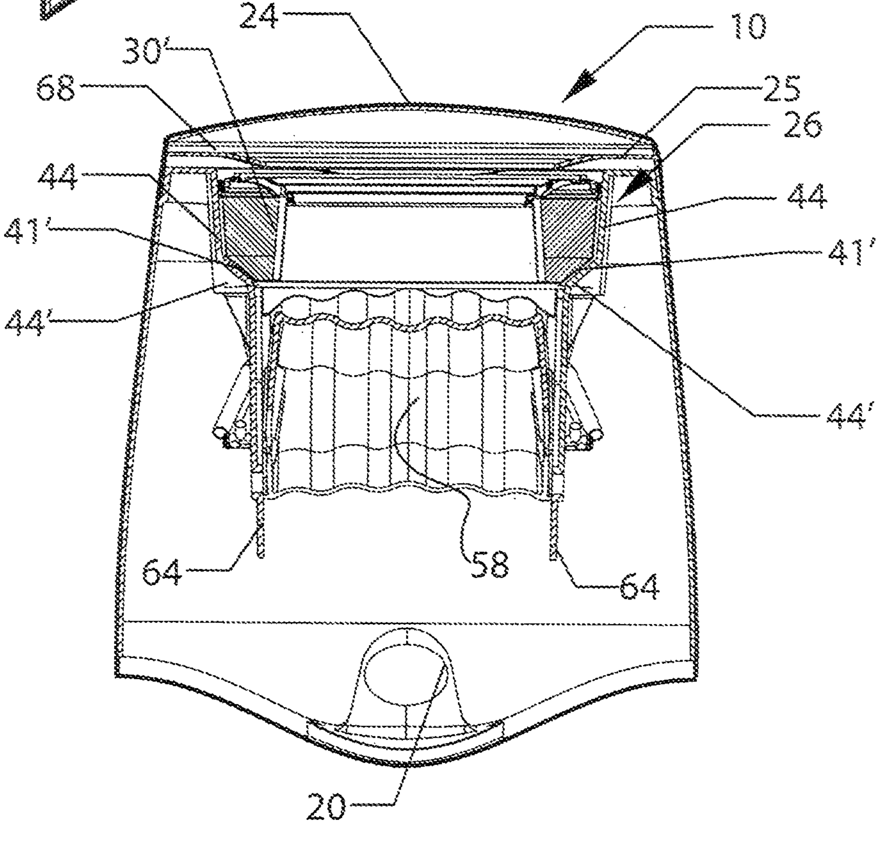
FIG. 4 is a cross-sectional view of an apparatus according to a second embodiment of the present invention.
Figure 5A:
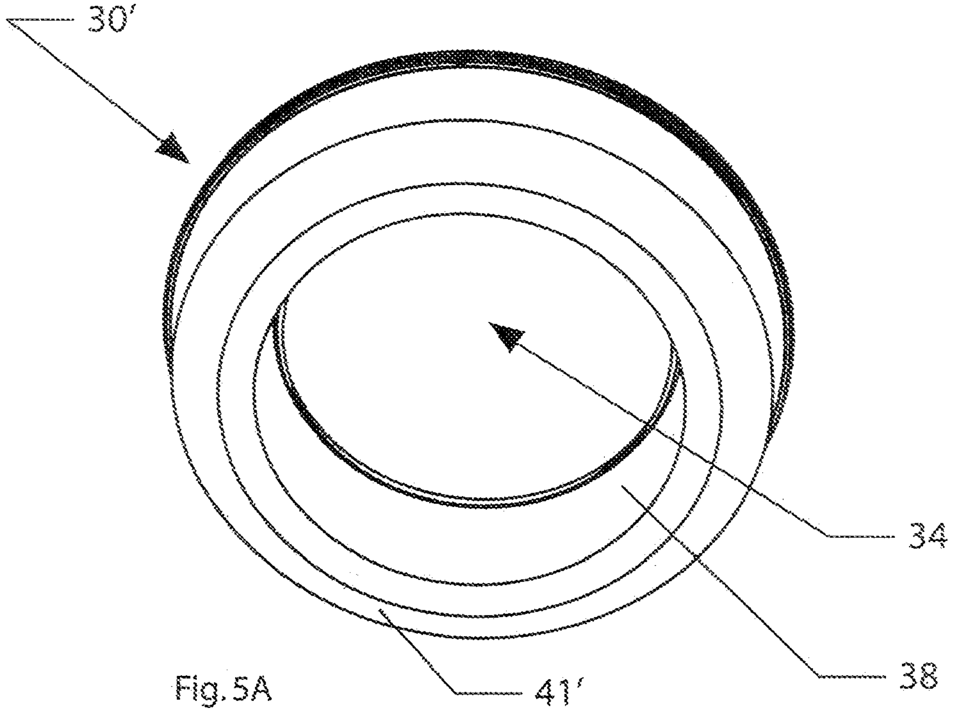
FIG. 5A is a bottom perspective view of a cassette to be used with the apparatus of FIG. 4.
Figure 5B:
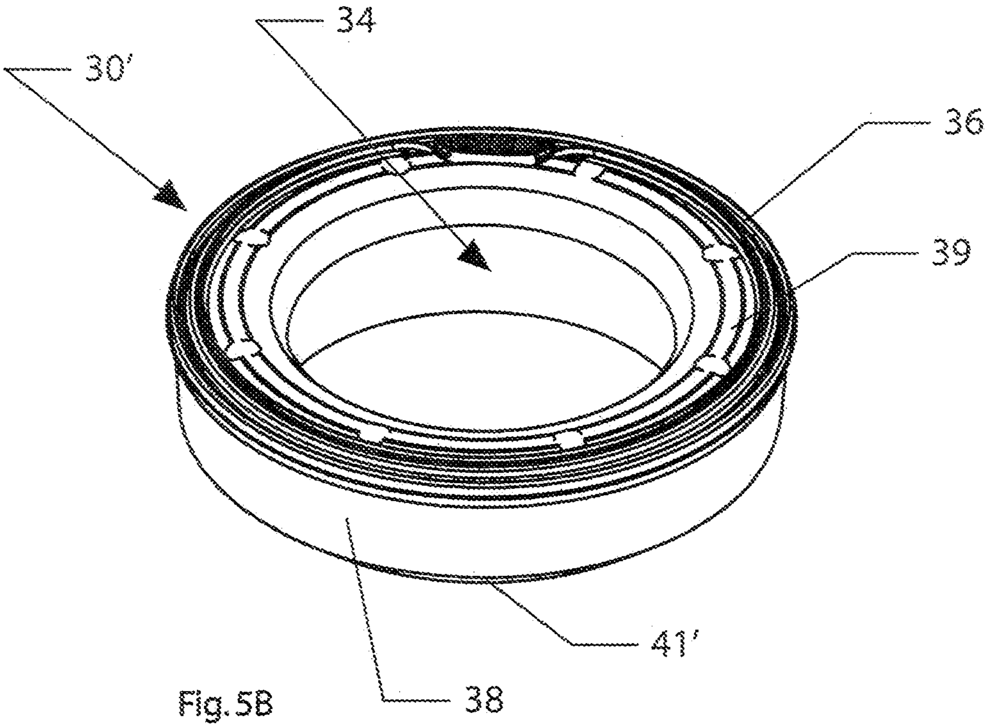
FIG. 5B is a top perspective view of the cassette of FIG. 5A.
Figure 6:
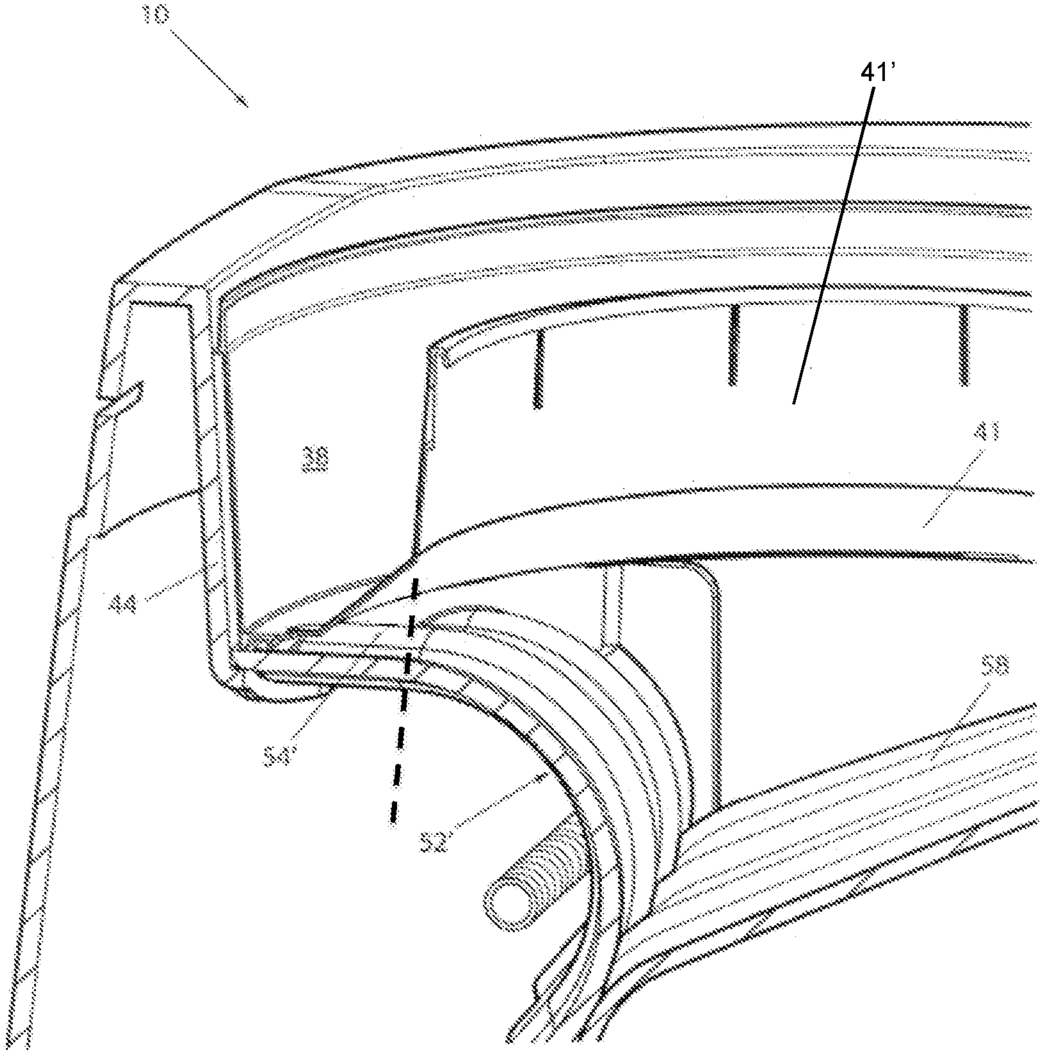
FIG. 6 is an enlarged perspective view of an apparatus in accordance with a third embodiment of the present invention.

In an alternative embodiment illustrated in FIGS. 4, 5A and 5B, the cassette 30' is provided with a tapered clearance 41' (forming a frustoconical geometry at the outer periphery of the bottom of the cassette 30') as opposed to a chamfer clearance 41. The tapered clearance 41' is used in conjunction with a tapered flange 44' in the holder 26 of the apparatus 10, as is clearly illustrated in FIG. 4 (i.e., the flange 44' defines an interference member of frustoconical shape). Accordingly, this complimentary shape ensures that the cassette 30' is properly oriented in the bolder 26, otherwise the funnel 25 could not be installed properly on the top of the bin 12. Moreover, the lid 24 and funnel 25 assembly would have problems closing with the improper orientation of the cassette 30'. It is pointed out that like reference numerals refer to like elements in FIGS. 1 and 4.

For each new disposable object to be packed, the process is repeated, each time either dropping the disposable object within the already drawn length of flexible tubing 32 within the enclosure 18, or drawing out an additional length of flexible tubing 32 from the cassette 30 to accommodate another disposable object as the disposable object moves down into the tube inside the apparatus 10, until the enclosure 18 is full, containing an object-filled segment of flexible film tubing 32. In this case, the top portion 14 is pivoted away from the bottom portion. The flexible tubing 32 is then cut, for example by using the cutting tool 70 provided, and then tied to form a substantially sealed pouch which can be removed from the bin 12. The top portion 14 is pivoted back into engagement with the bottom portion to use the apparatus 10 again as described above.

In another embodiment of the apparatus 10 using the cassette 30 of FIGS. 2A and 2B, the fixed portion 52' of the closing mechanism 50 has an upper end 54' that extends upwardly in the opening 22 of the bin 12. The upper end 54' is sized such that it also extends into the opening 34 of the cassette 30 when the cassette 30 is positioned in the holder 26. If it were positioned upside down, the cassette 30 would extend above the annular flange 42, and the ring 68 would not be positionable on the bin 12.

Figure 7:
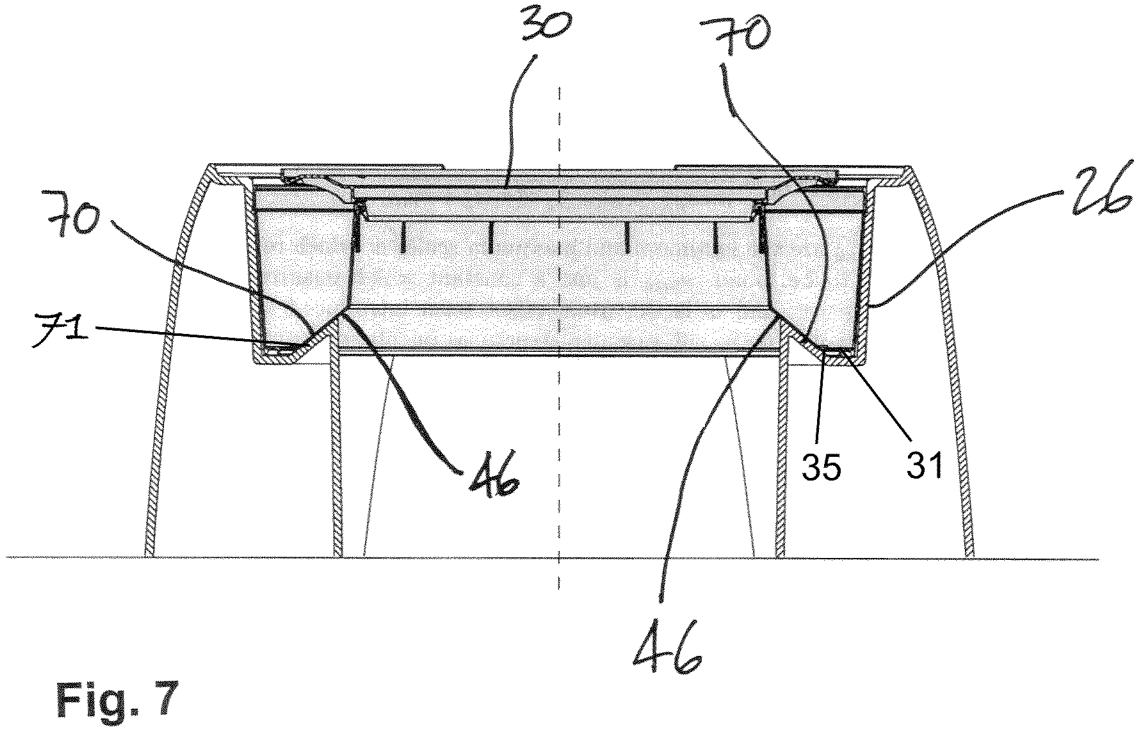
FIG. 7 is a sectional view illustrating the cassette of FIG. 2A as used with an apparatus having interfering members.

In another embodiment illustrated by FIG. 7, the holder 26 features an interfering member 70 that has a shape that is complementary to that of the cassette 30 with the chamfer clearance 41. As shown, the interfering member 70 has an oblique cassette-orienting wall 71 supporting the cassette 30. The edge 35 of the bottom annular receptacle 38 of the cassette 30 engages the oblique cassette-orienting wall 71. With the presence of the interfering member 70, the cassette 30 must properly be installed in the holder 26 to be used. As illustrated in FIG. 7, a pair of interfering members 70 may optionally be provided on both side of the holder 26.

Advantages of the apparatus 10 include the use of a wedge-type closing mechanism 50 of simple construction with few parts to seal the flexible tubing 32. The cassette configurations ensure that the cassette 30 is properly installed in the holder 26, thereby preventing contamination of the walls of the cassette (and the hands of the user person) as the properly installed cassette is mostly covered by the tubing 32 as is shown in FIG. 1. The mechanism 50 greatly reduces the complexity of the apparatus 10, makes the assembly simple, and allows for the use of a lesser quantity of flexible tubing 32 than prior-art devices. Furthermore, angling the course of the movable portion 58 permits the optimization of little horizontal clearance versus the force required to bias the movable portion 58. Finally, the shape of the individual portions of the mechanism prevents disposable objects from "coming back up"—that is, once a disposable object has been inserted under pressure to pull film material, it will be forced to remain in the flexible tubing by the closing mechanism 50.

The invention claimed is:

1. A method for disposing of objects in a pail of a waste disposal system having a film-dispensing cassette, the film-dispensing cassette including an annular receptacle defining a central opening, the annular receptacle including a volume receiving an elongated tube of flexible material radially outward of the central opening, the method comprising:

orienting the annular receptacle so as to have a bottom of the annular receptacle facing a cassette holder located in an upper portion of the pail;

seating a portion of the annular receptacle of the film-dispensing cassette in the cassette holder against an interfering member of the cassette holder having an oblique cassette-orienting wall supporting the annular receptacle, with part of the elongated tube of flexible material passing through the central opening of the annular receptacle and extending into an enclosure of the pail; and disposing waste into the elongated tube of flexible material that extends into the enclosure of the pail through the central opening of the annular receptacle.

2. The method of claim 1, comprising, folding the elongated tube of flexible material over an upper flange attached to the annular receptacle to pass the part of the elongated tube of flexible material through the central opening of the annular receptacle.

3. The method of claim 1, further comprising opening a lid of the pail to gain access to the cassette holder.

4. The method of claim 1, further comprising aligning the central opening of the annular receptacle with an opening of the cassette holder.

5. The method of claim 1, further comprising forming a bag end by knotting a free end of the elongated tube of flexible material.

6. The method of claim 1, comprising further withdrawing the elongated tube of flexible material from the volume of the annular receptacle.

7. The method of claim 1, further comprising cutting the elongated tube of flexible material, and forming a substantially sealed pouch by tying a cut end of the elongated tube of flexible material.

8. The method of claim 7, further comprising removing the substantially sealed pouch from the pail.

9. A method for installing a film-dispensing cassette in a pail of a waste disposal system, the film-dispensing cassette including an annular receptacle defining a central opening, the annular receptacle including a volume receiving an elongated tube of flexible material radially outward of the central opening, the method comprising:

withdrawing a length of the elongated tube of flexible material from the volume of the annular receptacle, the length of the elongated tube of flexible material including a free end of the elongated tube of flexible material;

passing the free end through the central opening of the annular receptacle; and seating the annular receptacle against an interfering member of a cassette holder in an upper portion of the pail, the interfering member having an oblique cassette-orienting wall supporting the annular receptacle and engaging an edge of the annular receptacle, the edge delimiting a lower surface of the annular receptacle.

10. The method of claim 9, wherein the withdrawing of the length of the elongated tube of flexible material from the volume of the annular receptacle includes pulling on the free end of the elongated tube of flexible material out from an upper annular opening of the annular receptacle, the upper annular opening defined atop the volume of the annular receptacle.

11. The method of claim 9, wherein the withdrawing of the length of the elongated tube of flexible material from the volume of the annular receptacle includes pulling the free end of the elongated tube of flexible material into an enclosure of the pail.

12. The method of claim 9, further comprising forming a bag end by knotting the free end of the elongated tube of flexible material.

13. The method of claim 12, wherein the forming of the bag end is achieved prior to the passing of the free end of the elongated tube of flexible material in the central opening of the annular receptacle.

14. The method of claim 9, further comprising aligning the central opening of the annular receptacle with an opening in the upper portion of the pail.

15. The method of claim 9, further comprising opening a lid of the pail to gain access to the cassette holder.

16. The method of claim 9, comprising, folding the length of the elongated tube of flexible material over an upper flange attached to the annular receptacle by the passing of the free end of the elongated tube of flexible material through the central opening of the annular receptacle.

17. The method of claim 9, wherein the seating of the annular receptacle includes abutting an oblique wall of the annular receptacle against the interfering member.

18. The method of claim 9, wherein the withdrawing of the length of the elongated tube of flexible material from the volume of the annular receptacle is achieved prior to the passing of the free end of the elongated tube of flexible material through the central opening, the passing of the free end being achieved prior to the seating of the annular receptacle against the interfering member of the cassette holder of the pail.

* * * * *